Patented Dec. 8, 1942

2,304,719

UNITED STATES PATENT OFFICE 2,304,719

MANUFACTURE OF TITANIUM DIOXIDE PIGMENTS

Isaac Ephraim Weber and Arthur Neville Copnall Bennett, Luton, England

No Drawing. Application May 13, 1940, Serial No. 335,014. In Great Britain May 18, 1939

13 Claims. (Cl. 106—292)

Titanium dioxide, alone or in the form of a composite pigment, is used in the manufacture of paints, lacquers, enamels, plastics artificial silk and in the compounding of rubber and in many other ways. It is necessary for the titanium dioxide to have certain desirable properties which are associated with fastness to light, resistance to weathering, oil absorption and wetting out properties both in water and oil media.

This invention is concerned with the improvement of these properties. It is customary to start with titanium dioxide from the hydrolysis of an acid titanium salt solution, to wash it and to calcine it in order to give it pigmentary properties.

The titanium dioxide may be calcined in any of the well known ways. The titanium dioxide may be calcined either continuously or in batch either in a stationary furnace or in a rotary furnace. The heating may be by oil, producer gas or by any other means, direct or indirect.

This invention consists in improving the aforesaid properties of the titanium dioxide by subjecting the titanium dioxide during the heating to the vapour of a metal or metal compound, this vapour either being introduced into the furnace as such or being formed formed therein from a suitable metal or metal compound introduced into the furnace otherwise than in admixture with the titanium dioxide.

In carrying out the invention, the vapour of a metal or metal compound may be produced by volatilisation at the entrance to the furnace. For example, where fuel oil is used as a heating agent for calcining the titanium dioxide the metal in a finely divided state is mixed with the oil and the mixture is passed together through the oil burner into the furnace. Where the finely divided metal is not readily miscible with the oil it may be kept in suspension by the addition of a small quantity of a suspending agent. The metal is volatilised in the flame from the burner so that the pigment is heated in the presence of the volatilised metal or its oxide, where the metal is capable of forming an oxide under the conditions which obtain in the furnace.

Instead of the metal one may incorporate with the oil a compound of the metal miscible with the oil or dispersible therein and generally speaking an organic compound of the metal will be suitable or an oxide of the metal. Uniform admixture of the metal compound with the oil may be assisted by the addition of an ionised oil, that is, an oil which has been subjected to a high tension electric discharge in the presence of an ionising gas; this treatment is known as "elektrionisation" and/or "voltolisation" and products of the treatment are known under the names "Elektrion" and "Voltol."

Where producer gas is used as the heating agent and where it may not be possible to mix the metal or metallic compound with the heating agent the metal or metallic compound may be volatilised in such a way that it passes with the heating agent into the furnace. There are many ways in which this can be done; for instance, the metal or compound of the metal is allowed to pass into the combustion chamber between the producer and the furnace containing the titanium dioxide. The heated metal or its compound may be volatilised outside the main source of heat which is being used in the calcination of the titanium dioxide and carried into the combustion chamber by means of air or steam. The volatilised or non-volatilised metal or compound of metal may be introduced at various parts of the furnace should this be desirable. Thus in a continuous rotary furnace the titanium dioxide will have passed through different stages of temperature between its entering and leaving the furnace and the volatilised metal or its compound can be introduced at any particular stage in order to give variation in the properties of the titanium dioxide pigment.

The invention affords a readily controlled method of treating titanium dioxide during calcination with varying quantities of metal.

Metals and their compounds which may be used for improving the properties of the titanium dioxide are, for example, antimony, zinc, lead, cadmium, aluminium, although we do not limit ourselves to these particular metals.

Although reference has been made to titanium dioxide, we mean by this titanium dioxide whether alone or admixed with other compounds which are capable of giving composite pigments.

The following examples illustrate the invention:

Example 1

7 lbs. of zinc oxide were mixed to form a very thick paste with 1½ lbs. of ionised oil and the paste was then thoroughly mixed with 9 gallons of fuel oil. The zinc oxide was so dispersed that practically nothing was deposited from the suspension during a period of several hours. The fuel oil containing the zinc oxide was used for firing a rotary furnace in which titanium dioxide was calcined by the continuous method at a temperature of approximately 900° C. The oil was fed to the burners of the furnace at the rate of 9.5 gallons per hour and the furnace was operated so that titanium dioxide was discharged at the rate of 224 lbs. of the dry dioxide per hour. The pigment produced in this manner had the following properties:

Whereas a titanium dioxide produced without treatment with zinc fume showed a tendency to chalk after a short time, a pigment produced according to the example only chalked slightly after a period ten times as long. The pigment had better wetting out properties than one produced in like manner without the treatment with zinc fume. The oil absorption of the pigment produced by the method of the example is only two-thirds that of a pigment produced without the zinc fume treatment.

The oil absorption of the pigments may be determined as follows: 3 grams of the pigment are placed on a glass tile and carefully mixed by means of a spatula with refined linseed oil added drop by drop from a graduated burette. Addition of the oil is continued until an end point is reached at which no change of contour is observed when the mixture on the tile is repeatedly "tapped" with a spatula blade. The volume of oil added in c.c. multiplied by 30.8 gives the oil absorption in grams of oil per 100 grams of pigment.

*Example 2*

14 lbs. of antimony oxide were mixed with 1 gallon of fuel oil and the mixture was ground to a paste, which was then mixed with 8.8 gallons of fuel oil. The antimony oxide was dispersed in the fuel oil and remained in suspension sufficiently long to enable the mixture to be fed through a burner to a continuously operated calcination furnace. The fuel oil containing the antimony oxide was fed to the furnace at the rate of 10 gallons per hour whilst the titanium dioxide left the furnace at the rate of 224 lbs. of dry titanium dioxide per hour. The temperature in the furnace was approximately 900° C. The titanium pigment so obtained had improved weathering properties and fastness to light.

*Example 3*

17 lbs. of zinc naphthenate were dissolved in 10 gallons of warm fuel oil, in which it dissolves very rapidly to give a solution homogeneous in appearance. The fuel oil containing the zinc naphthenate was fed to the furnace at the rate of 10 gallons per hour whilst the titanium dioxide left the furnace at the rate of 224 lbs. of dry titanium dioxide per hour. The temperature in the furnace was approximately 900° C. The pigment so obtained was improved in respect of its chalking and wetting out properties in comparison with a pigment prepared in like manner without use of zinc naphthenate.

*Example 4*

Titanium dioxide pulp containing approximately 37 per cent. of solids is fed into a rotary furnace fired by producer gas in which it is calcined at a temperature of approximately 900° C. Titanium dioxide leaves the furnace at the rate of 224 lbs. per hour. Cadmium metal is fed into the combustion chamber of the furnace either in the form of rod or powder at the rate of 9 lbs. per hour. The cadmium readily volatilises and passes into the rotary furnace. The presence of cadmium vapour in the furnace results in an improvement in the weathering, oil absorption and wetting out properties of the pigment.

1. A process for the production of improved titanium dioxide pigments, wherein titanium dioxide is calcined in an atmosphere containing the vapor of a substance selected from the group consisting of metals and compounds of metals, the said vapor being generated from a substance of the said group which is out of contact with the titanium dioxide.

2. A process as claimed in claim 1, wherein the calcination is conducted in a furnace fired by liquid fuel in which is suspended a finely divided material which forms vapour of a substance belonging to the group consisting of metals and metal compounds in the flame resulting from the combustion of the fuel.

3. A process as claimed in claim 1, wherein the calcination is conducted in a furnace fired by gaseous fuel and there is introduced into the combustion chamber of the furnace a material which forms therein vapour of a substance belonging to the group consisting of metals and compounds of metals, the vapor being carried into the furnace with the heating gases.

4. A process as claimed in claim 1, wherein the calcination is conducted in a furnace fired by gaseous fuel and the vapour of a substance belonging to the group consisting of metals and compounds of metals is introduced into the combustion chamber of the furnace and is carried into the furnace with the heating gases.

5. A process for the production of improved titanium dioxide pigments, wherein titanium dioxide is calcined in an atmosphere containing the vapour of a substance selected from the group consisting of antimony, zinc, lead, cadmium and their compounds, the said vapour being generated from a substance of the said group which is out of contact with the titanium dioxide.

6. A process as claimed in claim 5, wherein the calcination is conducted in a furnace fired by liquid fuel in which is suspended a finely divided material which forms vapour of a substance selected from the group consisting of antimony, zinc, lead, cadmium and their compounds in the flame resulting from the combustion of the fuel.

7. A process as claimed in claim 5, wherein the calcination is conducted in a furnace fired by gaseous fuel and there is introduced into the combustion chamber of the furnace a material which forms therein vapour of a substance selected from the group consisting of antimony, zinc, lead, cadmium and their compounds, the vapour being carried into the furnace with the heating gases.

8. A process as claimed in claim 5, wherein the calcination is conducted in a furnace fired by gaseous fuel and the vapour of a substance selected from the group consisting of antimony, zinc, lead, cadmium, and their compounds is introduced into the combustion chamber of the furnace and is carried into the furnace with the heating gases.

9. A process for the production of improved titanium dioxide pigments comprising the step of calcining titanium dioxide, wherein the vapour of a substance belonging to the group consisting of metals and compounds of metals is introduced into the calcining furnace during the calcination.

10. A process for the production of improved titanium dioxide pigments comprising the step of calcining titanium dioxide, wherein the vapour of a substance belonging to the group consisting of antimony, zinc, lead, cadmium and their compounds is introduced into the calcining furnace during the calcination.

11. A process for the production of improved titanium dioxide pigments as claimed in claim 5, wherein titanium dioxide is calcined in a furname fired by liquid fuel in which is suspended zinc oxide, the vapor of a substance belonging to the group consisting of zinc and compounds of zinc being thereby formed in the flame resulting from the combustion of the fuel.

12. A process for the production of improved titanium dioxide pigments as claimed in claim 5, wherein titanium dioxide is calcined in a furnace fired by liquid fuel in which is suspended antimony oxide, the vapor of a substance belonging to the group consisting of antimony and compounds of antimony being thereby formed in the flame resulting from the combustion of the fuel.

13. A process for the production of improved titanium dioxide pigments as claimed in claim 5, wherein titanium dioxide is calcined in a furnace fired by liquid fuel in which is suspended zinc naphthenate, the vapor of a substance belonging to the group consisting of zinc and compounds of zinc being thereby formed in the flame resulting from the combustion of the fuel.

ISAAC EPHRAIM WEBER.
ARTHUR NEVILLE COPNALL BENNETT.